June 12, 1951     T. R. SCOTT     2,556,224
COAXIAL CABLE HAVING POROUS WOUND SPACING MEANS
Filed Nov. 10, 1945     2 Sheets-Sheet 1

INVENTOR
THOMAS ROBERTSON SCOTT.
BY
ATTORNEY

June 12, 1951     T. R. SCOTT     2,556,224
COAXIAL CABLE HAVING POROUS WOUND SPACING MEANS
Filed Nov. 10, 1945     2 Sheets—Sheet 2

INVENTOR
THOMAS ROBERTSON SCOTT
BY
ATTORNEY

Patented June 12, 1951

2,556,224

UNITED STATES PATENT OFFICE 2,556,224

COAXIAL CABLE HAVING POROUS WOUND SPACING MEANS

Thomas Robertson Scott, London, England, assignor, by mesne assignments, to International Standard Electric Corporation, New York, N. Y., a corporation of Delaware Application November 10, 1945, Serial No. 627,948
In Great Britain October 20, 1944

Section 1, Public Law 690, August 8, 1946
Patent expires October 20, 1964

1 Claim. (Cl. 174—29)

This invention relates to electric cables using organic insulating material.

The present invention makes use of such organic insulating material that has been expanded to form a porous honeycomb structure. British patent specification No. 448,486 describes the use of extruded vinyl compounds that have been given such a porous honeycomb structure as continuous insulation over a conductor for use for example as a high frequency cable. The present invention, however, is not restricted to the use of vinyl compounds, although for certain uses thereof these are preferred.

The effect obtained by the use of expanded insulating material is that the amount of solid dielectric is reduced. If, however, the insulating material forms a continuous coating upon a conductor the flexibility necessary to an electric cable restricts the choice of materials that may be used.

According to one feature of the present invention there is provided an electric communication cable in which an outer conductor is spaced from an inner conductor or conductors by means of bodies of organic insulating material that have been expanded to form a porous honeycomb structure which bodies are separate by air spaces.

By this means the necessary flexibility of the cable can be obtained by the use of relatively inflexible materials.

It is of course well known in high frequency cables to use a coaxial or shielded pair construction in which the main part of the insulation between the conductors (in the case of a shielded pair) and between the inner conductor or conductors and the outer conductor is mainly air, the solid dielectric being reduced to the minimum necessary for mechanical considerations. The solid dielectric spacing means may be, for example, in the form of discs. By means of the present invention the mechanical strength is increased without increasing the amount of solid dielectric. The discs, for example, if made of material which has been expanded to a porous honeycomb structure can be of greater thickness than formerly for a given amount of solid dielectric. The mechanical strength of such expanded materials is not equal to that of the unexpanded materials but is not decreased in proportion to the degree of expansion, inasmuch as the expansion of the material builds up a certain amount of additional strength apparently by orientation of the molecules.

Materials such as polystyrene, polymerised 2.5 dichlorstyrene, polytetrafluoro-ethylene certainly meet the requirements for adequate mechanical strength and so do vulcanisible materials when vulcanised. There is however, a secondary requirement that the overall insulation shall have a permittivity of the order of 1.2 or less and a dielectric loss angle not greater than 0.0008 (at 1 mc./s.) to meet the requirements of the transmission characteristics of the cable and these requirements determine the total amount of air space that must be provided with a given solid dielectric, and the resistance to mechanical stress that can be achieved.

The resistance to mechanical stress of the expanded organic insulating material is not unduly decreased if the material is expanded to twice its volume. If however, attempts are made to expand it to three or four times the original volume the expanded material becomes fragile and lacking in compressive strength, whilst bending of a cable in which it is used may cause internal deformation and cracks. This is more particularly true of vinyl compounds unless they are plasticised somewhat heavily in which case they become more flexible but more easily deformed.

According to another feature of the present invention an electric cable is provided in which the insulation comprises a polymerised vinyl compound that has been expanded to a porous honeycomb structure permeated by gas under pressure greater than atmosphere, this cable being surrounded by a sheath impervious to the said gas.

The effect of this increased gas-pressure is twofold. First, the mechanical resistance of the expanded vinyl insulation to compressive forces is increased. For example, in the case of a submarine cable, the cable may be immersed in water at a greater depth than if the gas pressure within the expanded structure were at atmospheric pressure. Secondly, the electrical stress at which the insulation may be worked is increased, i. e. for equal dimensions the voltage that can be applied to the cable is increased. A further increase in the electrical stress at which the insulation may be worked is obtained if a small quantity i. e. up to 5% of dichlorodifluoromethane is incorporated in the gas as claimed in British Patent No. 553,569.

In consequence of the effects stated above, an electric cable answering to this aspect of the invention is suitable for a communication cable or a power cable or both.

The gas used is preferably inert e. g. nitrogen or helium and the gas pressure is slowly raised to the desired level so that gas enters the honeycomb structure by diffusion through the thin partitions separating the air spaces and eventually pressure equilibrium is reached internally and externally of the expanded honeycomb structure at the desired pressure level. In building up the pressure in the honeycomb structure it may be desirable to reduce the temperature of the expanded material below normal ambient temperature so that expansion of the gas occurs when the material is restored to normal ambient temperature with a consequent elevation of pressure.

The insulation is preferably formed in such a way as to leave gas channels to facilitate the permeation of the gas into the whole of the insulating material. The insulating material may be applied by extrusion, the shape of the extrusion die being such as to leave longitudinal gas channels at portions of the insulation immediately surrounding the conductor and/or immediately within the enclosing sheath. In this case the expansion of the insulating material into honeycomb structure may take place during the extrusion. On the other hand the insulating material may be applied in the form of discs, as previously mentioned, or in the form of tapes. These tapes or discs may be cut from previously expanded material, or tapes may be directly extruded in that form and expanded after or during extrusion. The tapes or discs are then preferably applied in such manner that spaces are left between them so that these spaces form gas channels to facilitate the building up of the pressure throughout the insulation and also confer flexibility upon the finished cable.

In a cable for use with high voltages the primary consideration is high dielectric strength. Although low dielectric losses and low capacitance are necessary, these characteristics must in general be treated as secondary to the dielectric strength requirement. The electrical stress diminishes from the conductor to the outer electrostatic screen in accordance with a logarithmic law and thus it is of considerable importance that the layer of insulation adjacent to the conductor should be of high dielectric strength and should be free from gas channels of considerable length radially.

It is preferable therefore that in cables according to the present invention intended for use at high voltages, the layer of insulation adjacent the conductor should be an unexpanded layer. This layer is surrounded by insulation that has been expanded into a porous honeycomb structure, applied either by extrusion or as tapes and permeated by gas under pressure greater than atmospheric. The solid extruded layer next to the conductor inevitably contains, as applied, a few small voids or gas spaces which arise either during the extrusion process or during heating and cooling cycles that occur in the working of the cable. Such voids are however reduced by the gas pressure in the external layers acting upon the solid insulation and the spaces that remain are brought up to the increased pressure by diffusion of the gas through the material. The outer expanded layer reduces the overall capacitance of the cable, by reduction of the solid content of the insulation, and also causes a readjustment of the logarithmic stress law whereby the maximum stress at the outer surface of the conductor is reduced and the minimum stress at the outer electrostatic screen is increased. Since the overall dielectric strength of the cable is largely determined by the maximum stress, this is of considerable importance in increasing the breakdown strength of the cable.

Embodiments of the inventions are hereinafter described with reference to the accompanying drawings in which.

Figure 1:
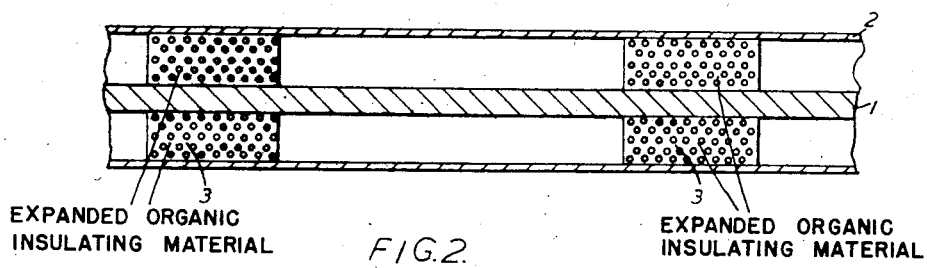
Figures 1 and 2 show in longitudinal and transverse section respectively a coaxial communication cable according to the invention.
Figure 2:
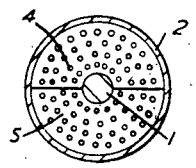

Referring to the drawings, Figures 1 and 2 show in longitudinal and transverse section respectively a co-axial communication cable of the kind in which a central conductor 1 is maintained in coaxial relation with an outer conductor 2 by means of a plurality of discs or beads 3 spaced apart along the conductor 2. In accordance with the present invention each bead is constructed of organic insulating material that has been expanded to form a honeycomb structure. The beads 3 are of greater thickness than the discs of the same material but unexpanded that are used in known constructions and thus confer greater mechanical strength for a given quantity of solid dielectric. The beads 3 may be formed of expanded polystyrene, expanded polythene, expanded polymerised 2.5 dichlorostyrene or expanded polytetrafluorethylene, but expanded vulcanisable materials may be used that are afterwards vulcanised. The beads 3 are preferably built up round the conductor 1 by cementing welding or fusing together a number of portions. As shown in Figure 2 each bead 3 consists of two halves 4, 5 semi-circular in cross section. These portions 4, 5 may be joined together by means of a suitable cement. If, for example, the portions 4, 5 are expanded polystyrene a cement consisting of polystyrene dissolved in monomeric styrene is used. Other forms of sectional construction may be employed.

It is clear that a similar construction can be used for a shielded pair cable or a shielded quad, two or four conductors being spaced apart and held in spaced relationship within an outer shield 2 by means of beads 3 of expanded organic insulating material.

If the cable shown in Figures 1 and 2 be used also at high voltage, the space within the outer conductor 2 should preferably be filled with gas under pressure greater than atmospheric, more particularly if the beads 3 are composed of a vinyl compound such as polystyrene spaced somewhat closely in a cable intended to be of comparatively high flexibility. In such case it will be found necessary, in order to provide the necessary flexibility to the cable that the material forming the beads 3 be plasticised decreasing its mechanical strength. The provision of a filling of gas under pressure then serves to restore the resistance to deformation of the cable.

The inner conductor 1 may be spaced from the outer conductor 2 by means of one or more helical insulators, composed of expanded organic insulating material.

Figure 3:
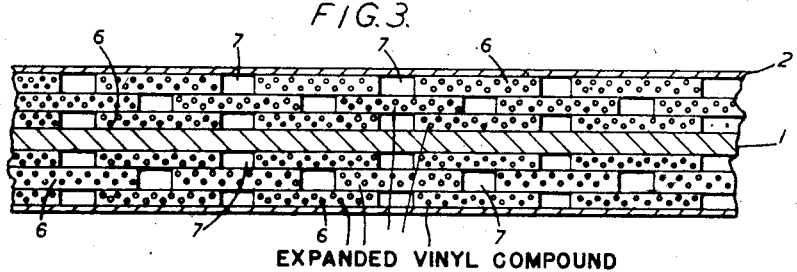
Figure 3 shows in longitudinal section a cable according to the invention using a plurality of layers of tapes as insulation.

Thus, Figure 3 shows in longitudinal section a cable in which the inner conductor 1 is spaced from an outer impervious sheath 2 by means of three layers of tape 6 wound with a comparatively short lay leaving spaces 7 for gas. The turns of one layer overlap the turns of the adjacent layers. The cable of Figure 3 is suitable for a high frequency communication cable carrying comparatively high voltages provided the tapes 6 are composed of an expanded vinyl compound such as expanded polystyrene, plasticised with a low loss plasticiser.

The tapes 6 may, however, be wound with a comparatively long lay and in this case alternate layers are preferably applied with opposite lay, e. g. first layer right hand, second layer left hand and so on. Preferably also the outermost layer is either a layer of tape applied with a short helical lay or an outermost layer of extruded material is applied overall. The tapes may be trapezoidal in cross section.

Figure 4:
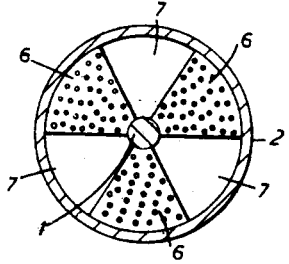
Figure 4 shows in transverse section a cable in which a single layer of tapes is used.

Figure 4 shows a transverse cross section of a cable in which a single layer of three tapes 6 trapezoidal in cross section acts as a spacing means between conductor 1 and outer sheath 2 in such manner that half the cross section of the space between inner conductor 1 and sheath 2 is occupied by the expanded vinyl compound.

Figure 5:
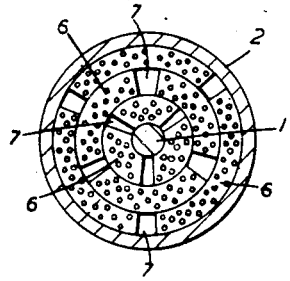
Figure 5 shows in transverse section a cable in which a plurality of layers of tapes are used each layer applied with a long lay.

Figure 5 shows three layers of tape 6 between the conductor 1 and outer conducting sheath 2 each layer laid with a long lay and with gas spaces 7 between.

Figure 6:
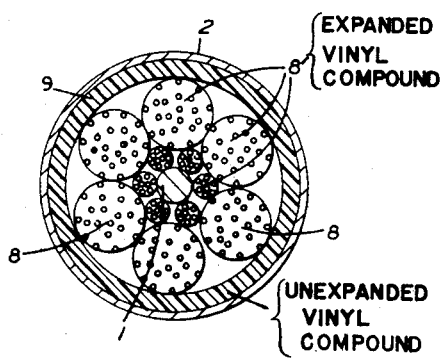
Figure 6 shows in transverse section a cable according to the invertion in which cords are used as separators.

Figure 6 shows a cable in which the separators between outer and inner conductors 1 and 2 are in the form of helical cords 8 of expanded vinyl compound laid up into a long lay and having an extruded outer layer 9 applied thereover. The outer conductor 2 is applied over the layer 9. The layer 9 may be of the same vinyl compound as are the cords 8 but unexpanded. The layer 9 could however, equally be made of the expanded vinyl compound.

Figure 7:
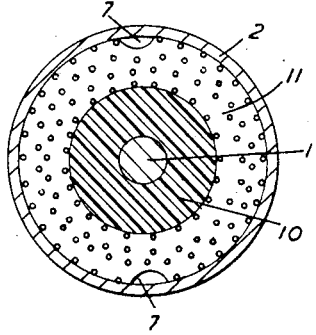
Figures 7, 8 and 9 show in transverse section cables according to the invention intended for high voltage work.

Figure 7 shows a cable primarily intended for high voltage work. The conductor 1 is surrounded by a layer 10 of unexpanded vinyl compound applied by extrusion. Over the layer 10 is applied by extrusion a layer 11 of expanded vinyl compound and over this an impervious sheath such as a lead sheath 2. Gas channels 7 are left in the layer 11 so that the gas under pressure will permeate the whole of the layer 11 and also as explained above the gas can diffuse into the material of layer 10 and fill any remaining voids therein.

Figure 8:
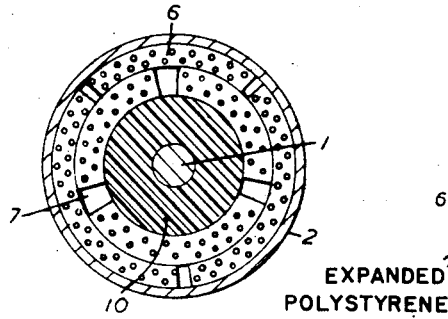

Figure 8 shows another form of cable designed for the same purpose, in which the layer 10 of extruded unexpanded material is surrounded by two layers of tape 6 of expanded material having gas channels 7 left between the lays of each tape.

In Figures 7 and 8 the extruded layer 10 is preferably made of a flexible material such as a solid polymer of ethylene or its derivative polytetrafluorethylene or a co-polymer of styrene with butadiene or rubber, or a co-polymer of dichlorastyrene with butadiene, or rubber. Chloroprene and butyl rubber are also suitable. The expanded material may also comprise these same materials.

The impervious sheath 2 in these figures may, instead of a lead sheath be formed of a conductive plastic such as polyisobutylene loaded with carbon black or conducting rubber or conducting synthetic rubber, as the loading of carbon black or the like for rendering the material conductive may also be used to render it substantially impervious to gas by correct choice of the carbon used. This sheath is then mechanically reinforced against the relatively high gas pressure within it by any well known means.

Figure 9:
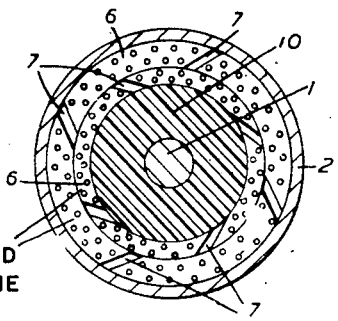

The expanded tapes 6 may be cut to parallelogram form in cross section as shown in Figure 9, so that the gas spaces 7 are non-radial and present a longer breakdown path coupled with a smaller radial gas space.

A plurality of cores insulated and sheathed as shown in Figures 7, 8 or 9 may be laid up within a common impervious sheath suitably reinforced, a gas pressure being applied within the common sheath which is substantially less than that applied within each insulated and sheathed core.

What is claimed is:

In a high frequency electric communication cable of the type wherein an insulated central conductor is maintained coaxially within a tubular outer conductor by spacing means and all being enclosed within a gas-impervious sheath, the improved spacing means that comprises a plurality of tapes, formed of electrical insulative material having a porous honeycomb structure and being of parallelogram cross-sectional outline, parallel-wound as axially spaced helices in a series of layers with successive layers wound in counter-lay, overlying the insulated central conductor, whereby the space between neighboring helices within a common layer defines non-radial gas spaces, the cross-sectional area of the tapes being such that it totals half the cross-sectional area of space between the inner conductor and the sheath.

THOMAS ROBERTSON SCOTT.

REFERENCES CITED

The following references are of record in the file of this patent:

UNITED STATES PATENTS

| Number | Name | Date |
| --- | --- | --- |
| 449,400 | Bishop | Mar. 31, 1891 |
| 1,947,676 | Scott et al. | Feb. 20, 1934 |
| 1,977,325 | Pfannkuch | Oct. 16, 1934 |
| 2,029,421 | Green et al. | Feb. 4, 1936 |
| 2,075,996 | Noyes | Apr. 6, 1937 |
| 2,186,793 | Wodtke | Jan. 9, 1940 |
| 2,216,010 | Hobart | Sept. 24, 1940 |
| 2,217,104 | Crandall | Oct. 8, 1940 |
| 2,298,324 | Williams | Oct. 13, 1942 |

FOREIGN PATENTS

| Number | Country | Date |
| --- | --- | --- |
| 334,840 | Great Britain | Sept. 9, 1930 |
| 553,569 | Great Britain | May 27, 1943 |